United States Patent
Glasson

Patent Number: 5,963,748
Date of Patent: Oct. 5, 1999

[54] CAMERA ELEVATING AND VIEWING APPARATUS

[76] Inventor: Michael J. Glasson, 30 Malford Grove, Gilwern, Abergavenny, Monmouthshire, United Kingdom, NP7 0RN

[21] Appl. No.: 08/955,593
[22] Filed: Oct. 22, 1997
[51] Int. Cl.⁶ ..................................................... G03B 17/00
[52] U.S. Cl. ............................................................ 396/420
[58] Field of Search ................................... 396/419–428; 359/402–406

[56] References Cited

U.S. PATENT DOCUMENTS 1,311,087  7/1919  Olmsted ..................................... 359/402
4,133,607  1/1979  Mansho ...................................... 396/420

Primary Examiner—Howard B. Blankenship

[57] ABSTRACT

A camera elevating and viewing apparatus for providing a view of subjects not clear at eye level. The inventive device includes an elongated central tube having open upper and lower ends. A support bracket is secured to and extends outwardly from the central tube. The support bracket supports a camera thereon. An upper viewing tube is coupled with the open upper end of the central tube. The upper viewing tube aligns with a viewfinder of the camera when positioned on the support bracket. A lower viewing tube is coupled with the open lower end of the central tube. The lower viewing tube has an open outer end with an eye piece disposed thereon.

8 Claims, 3 Drawing Sheets

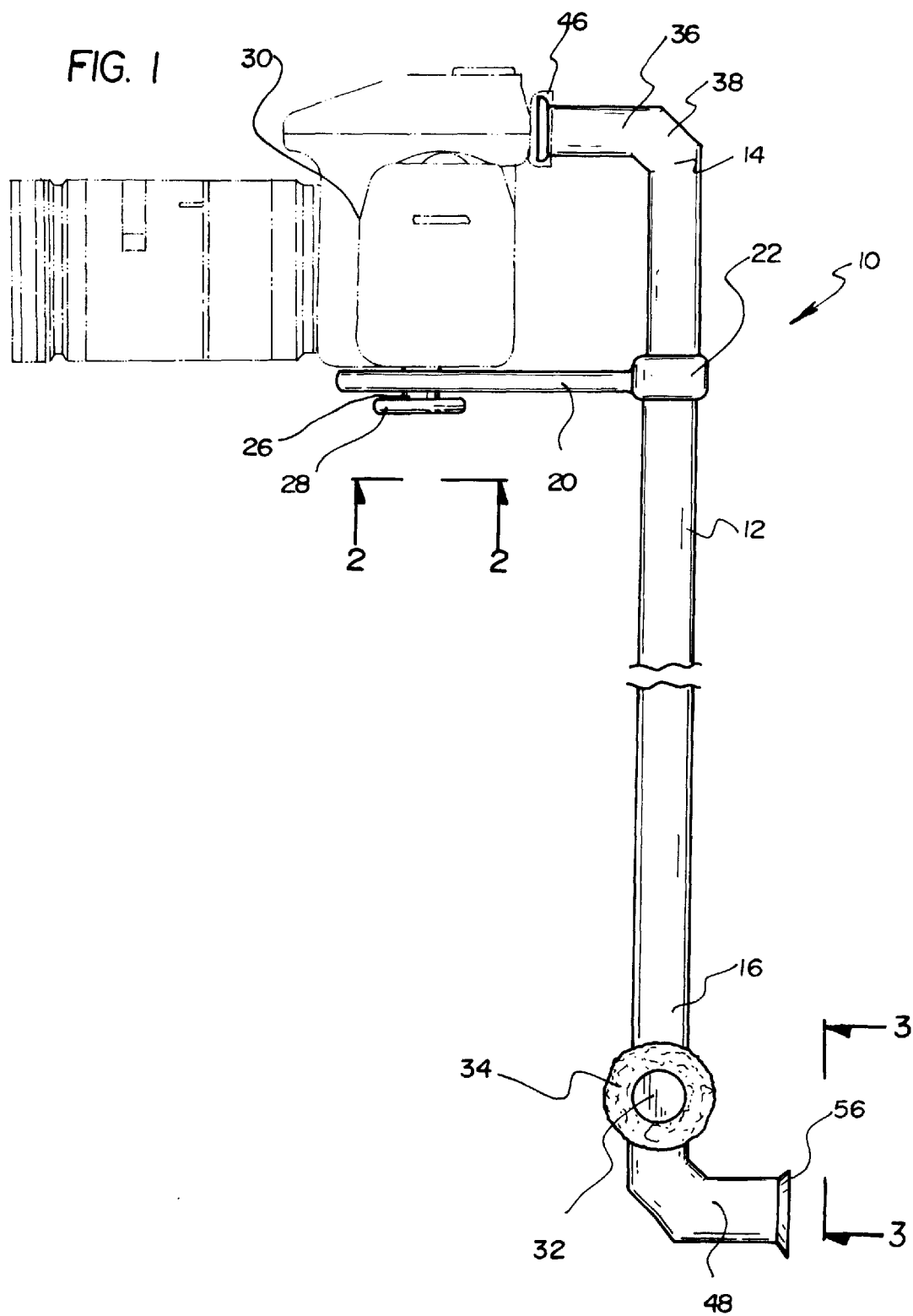

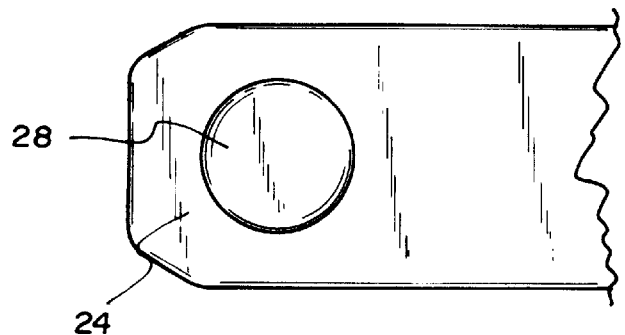
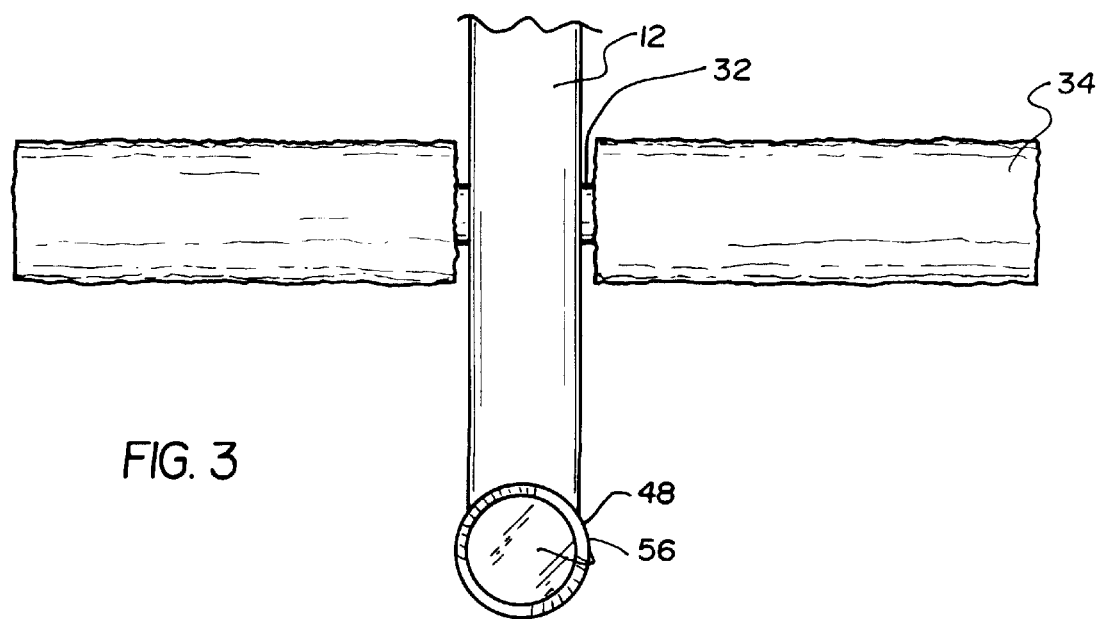

CAMERA ELEVATING AND VIEWING APPARATUS

BACKGROUND OF THE INVENTION

1. Field of the Invention

The present invention relates to camera accessories and more particularly pertains to a new camera elevating and viewing apparatus for providing a view of subjects not clear at eye level.

2. Description of the Prior Art

The use of camera accessories is known in the prior art. More specifically, camera accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art camera accessories include U.S. Pat. No. 4,133,607 to Mansho; U.S. Pat. No. 4,226,518 to Kellner; U.S. Pat. No. Des. 272,924 to Sahler; U.S. Pat. No. 4,235,541 to Jamel; U.S. Pat. No. 4,868,588 to Hajnal; and U.S. Pat. No. 4,110,011 to Tausch.

While these devices fulfill their respective, particular objectives and requirements, the aforementioned patents do not disclose a new camera elevating and viewing apparatus. The inventive device includes an elongated central tube having open upper and lower ends. A support bracket is secured to and extends outwardly from the central tube. The support bracket supports a camera thereon. An upper viewing tube is coupled with the open upper end of the central tube. The upper viewing tube aligns with a viewfinder of the camera when positioned on the support bracket. A lower viewing tube is coupled with the open lower end of the central tube. The lower viewing tube has an open outer end with an eye piece disposed thereon.

In these respects, the camera elevating and viewing apparatus according to the present invention substantially departs from the conventional concepts and designs of the prior art, and in so doing provides an apparatus primarily developed for the purpose of providing a view of subjects not clear at eye level.

SUMMARY OF THE INVENTION

In view of the foregoing disadvantages inherent in the known types of camera accessories now present in the prior art, the present invention provides a new camera elevating and viewing apparatus construction wherein the same can be utilized for providing a view of subjects not clear at eye level.

The general purpose of the present invention, which will be described subsequently in greater detail, is to provide a new camera elevating and viewing apparatus apparatus and method which has many of the advantages of the camera accessories mentioned heretofore and many novel features that result in a new camera elevating and viewing apparatus which is not anticipated, rendered obvious, suggested, or even implied by any of the prior art camera accessories, either alone or in any combination thereof.

To attain this, the present invention generally comprises an elongated central tube having open upper and lower ends. The central tube has an annular protuberance disposed downwardly of the open upper end thereof. A support bracket is secured to and extends outwardly from the central tube in an orthogonal relationship. The support bracket has a support ring secured to the annular protuberance of the central tube. A free end of the support bracket has a threaded bolt extending upwardly thereof. The threaded bolt has a handle on a lower end thereof. The support bracket supports a camera thereon with the threaded bolt engaging a tripod bush of the camera. A pair of handles are secured to and extend outwardly from the central tube upwardly of the open lower end thereof. The handles each have padding disposed thereon. An upper viewing tube is coupled with the open upper end of the central tube. The upper viewing tube has an angularly disposed inner portion positioned above the open upper end of the central tube. The angularly disposed inner portion has a mirror disposed on an interior surface thereof. The upper viewing tube has a pair of corrective lenses therein disposed inwardly of an open outer end. The open outer end aligns with a viewfinder of the camera when positioned on the support bracket. A lower viewing tube is coupled with the open lower end of the central tube. The lower viewing tube has an angularly disposed inner portion positioned below the open lower end of the central tube. The angularly disposed inner portion has a mirror disposed on an interior surface thereof. The lower viewing tube has an open outer end with an eye piece disposed thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new camera elevating and viewing apparatus apparatus and method which has many of the advantages of the camera accessories mentioned heretofore and many novel features that result in a new camera elevating and viewing apparatus which is not anticipated, rendered obvious, suggested, or even implied by any of the prior art camera accessories, either alone or in any combination thereof.

It is another object of the present invention to provide a new camera elevating and viewing apparatus which may be easily and efficiently manufactured and marketed.

It is a further object of the present invention to provide a new camera elevating and viewing apparatus which is of a durable and reliable construction.

An even further object of the present invention is to provide a new camera elevating and viewing apparatus which is susceptible of a low cost of manufacture with regard to both materials and labor, and which accordingly is then susceptible of low prices of sale to the consuming public, thereby making such camera elevating and viewing apparatus economically available to the buying public.

Still yet another object of the present invention is to provide a new camera elevating and viewing apparatus which provides in the apparatuses and methods of the prior art some of the advantages thereof, while simultaneously overcoming some of the disadvantages normally associated therewith.

Still another object of the present invention is to provide a new camera elevating and viewing apparatus for providing a view of subjects not clear at eye level.

Yet another object of the present invention is to provide a new camera elevating and viewing apparatus which includes an elongated central tube having open upper and lower ends. A support bracket is secured to and extends outwardly from the central tube. The support bracket supports a camera thereon. An upper viewing tube is coupled with the open upper end of the central tube. The upper viewing tube aligns with a viewfinder of the camera when positioned on the support bracket. A lower viewing tube is coupled with the open lower end of the central tube. The lower viewing tube has an open outer end with an eye piece disposed thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of a new camera elevating and viewing apparatus according to the present invention.

FIG. 2 is a bottom view of the mounting screw of the present invention as taken along line 2—2 of FIG. 1.

FIG. 3 is a front view of the eye piece and handle of the present invention as taken along line 3—3 of FIG. 1.

DESCRIPTION OF THE PREFERRED EMBODIMENT

Figure 4:
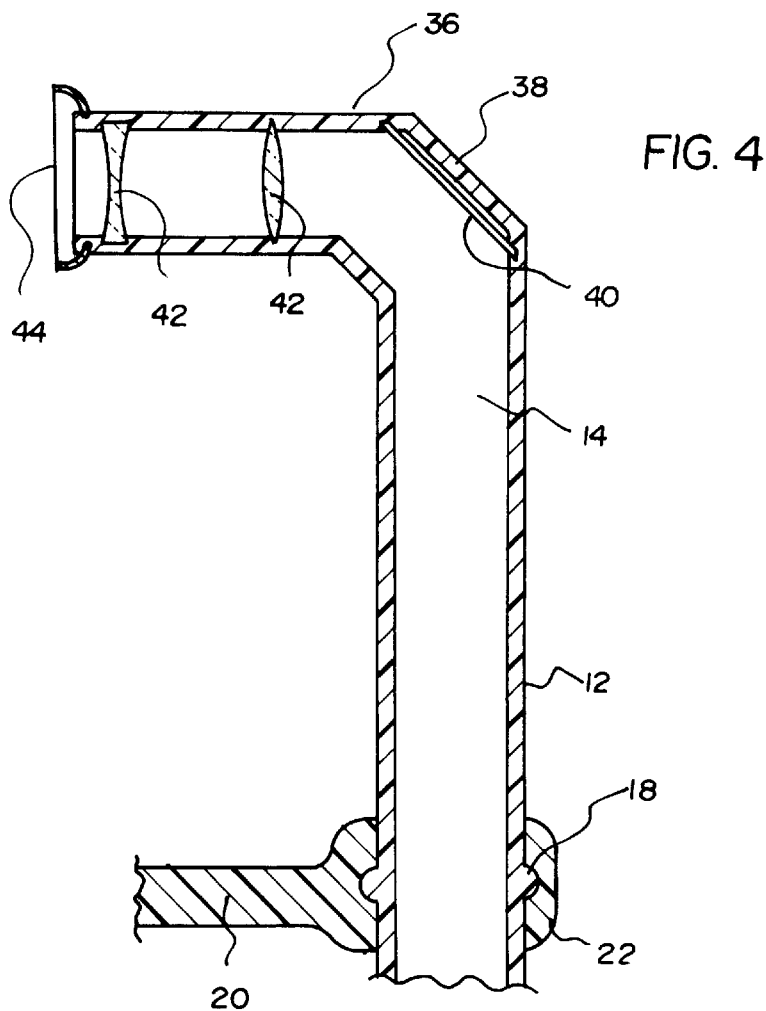
FIG. 4 is a cross-sectional view of the upper viewing tube of the present invention.
Figure 5:
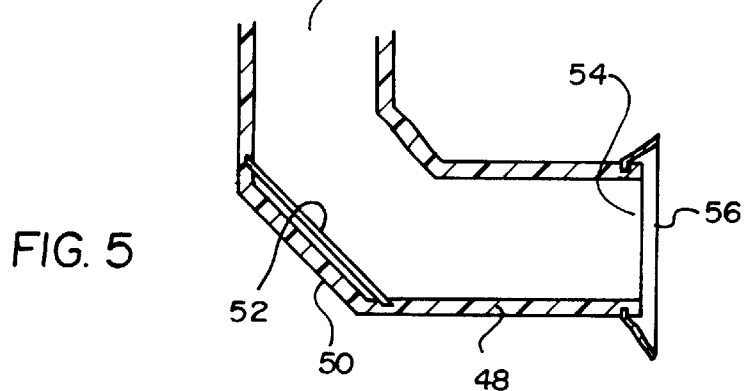
FIG. 5 is a cross-sectional view of the lower viewing tube of the present invention.

With reference now to the drawings, and in particular to FIGS. 1 through 5 thereof, a new camera elevating and viewing apparatus embodying the principles and concepts of the present invention and generally designated by the reference numeral 10 will be described.

As best illustrated in FIGS. 1 through 5, the camera elevating and viewing apparatus 10 comprises an elongated central tube 12 having open upper 14 and lower ends 16. The central tube 12 has an annular protuberance 18 disposed downwardly of the open upper end 14 thereof.

A support bracket 20 is secured to and extends outwardly from the central tube 12 in an orthogonal relationship. The support bracket 20 has a support ring 22 secured to the annular protuberance 18 of the central tube 12. A free end 24 of the support bracket 20 has a threaded bolt 26 extending upwardly therethrough. The threaded bolt 26 has a handle 28 on a lower end thereof. The support bracket 20 supports a camera 30 thereon with the threaded bolt 26 engaging a tripod bush of the camera 30.

A pair of handles 32 are secured to and extend outwardly from the central tube 12 upwardly of the open lower end 16 thereof. The handles 32 each have padding 34 disposed thereon.

An upper viewing tube 36 is coupled with the open upper end 14 of the central tube 12. The upper viewing tube 36 has an angularly disposed inner portion 38 positioned above the open upper end 14 of the central tube 12. The angularly disposed inner portion 38 has a mirror 40 disposed on an interior surface thereof. The upper viewing tube 36 has a pair of corrective lenses 42 therein disposed inwardly of an open outer end 44. The open outer end 44 aligns with a viewfinder 46 of the camera 30 when positioned on the support bracket 20.

A lower viewing tube 48 is coupled with the open lower end 16 of the central tube 12. The lower viewing tube 48 has an angularly disposed inner portion 50 positioned below the open lower end 16 of the central tube 12. The angularly disposed inner portion 50 has a mirror 52 disposed on an interior surface thereof. The lower viewing tube 48 has an open outer end 54 with an eye piece 56 disposed thereon.

In use, the device 10 would secure a 35 mm camera body and lens in an elevated position. This device 10 would provide a view of subjects not clear at eye level. The device 10 contains some components typically used in a standard periscope. The mirrors 40, 52 positioned with the upper and lower viewing tubes 36, 48 provide an accurate reflection of the image that would ordinarily be seen through the camera's viewfinder 46. The support bracket 20 holds and stabilizes the camera 30. When in position, the camera viewfinder 46 would meet the open outer end 44 of the upper viewing tube 36 at the corrective lenses 42. The pair of handles 32 allow the photographer to hold the device 10 and the camera 30 securely while taking pictures.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A camera elevating and viewing apparatus for providing a view of subjects unable to be seen clearly at eye level comprising, in combination:

an elongated central tube having open upper and lower ends, the central tube having an annular protuberance disposed downwardly of the open upper end thereof;

a support bracket secured to and extending outwardly from the central tube in an orthogonal relationship, the support bracket having a support ring secured to the annular protuberance of the central tube, a free end of the support bracket having a threaded bolt extending upwardly therethrough, the threaded bolt having a handle on a lower end thereof, the support bracket supporting a camera thereon with the threaded bolt engaging a tripod bush of the camera;

a pair of handles secured to and extending outwardly from the central tube upwardly of the open lower end thereof, the handles each having padding disposed thereon;

an upper viewing tube coupled with the open upper end of the central tube, the upper viewing tube having an angularly disposed inner portion positioned above the open upper end of the central tube, the angularly disposed inner portion having a mirror disposed on an interior surface thereof, the upper viewing tube having a pair of lenses therein disposed inwardly of an open outer end, the open outer end aligning with a viewfinder of the camera when positioned on the support bracket; and a lower viewing tube coupled with the open lower end of the central tube, the lower viewing tube having an angularly disposed inner portion positioned below the open lower end of the central tube, the angularly disposed inner portion having a mirror disposed on an interior surface thereof, the lower viewing tube having an open outer end with an eye piece disposed thereon.

2. A camera elevating and viewing apparatus comprising:

an elongated central tube having open upper and lower ends;

a support bracket secured to and extending outwardly from the central tube, the support bracket supporting a camera thereon;

wherein the elongated central tube has an annular protuberance disposed downwardly of the open upper end thereof for engaging the support bracket;

wherein the support bracket has a support ring secured to the annular protuberance of the central tube;

an upper viewing tube coupled with the open upper end of the central tube, the upper viewing tube aligning with a viewfinder of the camera when positioned on the support bracket; and a lower viewing tube coupled with the open lower end of the central tube, the lower viewing tube having an open outer end with an eye piece disposed thereon.

3. The camera elevating and viewing apparatus as set forth in claim 2 wherein a free end of the support bracket having a threaded bolt extending upwardly therethrough, the threaded bolt having a handle on a lower end thereof, the threaded bolt engaging a tripod bush of the camera.

4. The camera elevating and viewing apparatus as set forth in claim 2 and further including a pair of handles secured to and extending outwardly from the central tube upwardly of the open lower end thereof, the handles each having padding disposed thereon.

5. The camera elevating and viewing apparatus as set forth in claim 2 wherein the upper viewing tube has an angularly disposed inner portion positioned above the open upper end of the central tube, the angularly disposed inner portion having a mirror disposed on an interior surface thereof, the upper viewing tube having a pair of lenses therein disposed inwardly of an open outer end.

6. The camera elevating and viewing apparatus as set forth in claim 2 wherein the lower viewing tube has an angularly disposed inner portion positioned below the open lower end of the central tube, the angularly disposed inner portion having a mirror disposed on an interior surface thereof.

7. The camera elevating and viewing apparatus as set forth in claim 5 wherein the lenses are corrective lenses adapted for focusing light passing through the upper viewing tube.

8. A camera elevating and viewing apparatus for providing a view of subjects unable to be seen clearly at eye level comprising, in combination:

an elongated central tube having open upper and lower ends;

a support bracket secured to and extending outwardly from the central tube, the support bracket supporting a camera thereon, the support bracket having a support ring secured to the central tube; and an upper viewing tube coupled with the open upper end of the central tube, the upper viewing tube aligning with a viewfinder of the camera when positioned on the support bracket;

wherein the upper viewing tube has an angularly disposed inner portion positioned above the open upper end of the central tube, the angularly disposed inner portion having a mirror disposed on an interior surface thereof, the upper viewing tube having a pair of lenses therein disposed inwardly of an open outer end; and wherein the lenses are corrective lenses adapted for focusing light passing through the upper viewing tube.

* * * * *